United States Patent Office 3,579,356
Patented May 18, 1971

3,579,356
TITANIUM DIOXIDE WHITENED COMESTIBLE COMPOSITIONS
Donald E. Miller, Oak Park, and Cecelia R. Gilmore, Oak Lawn, Ill., assignors to SCM Corporation, Cleveland, Ohio
No Drawing. Filed Apr. 24, 1968, Ser. No. 723,920
Int. Cl. A23l 1/27
U.S. Cl. 99—148
8 Claims

ABSTRACT OF THE DISCLOSURE

Compositions comprising comestible base and a blend of $TiO_2$, and an edible organic nitrogen-containing, sulfur containing, or sulfur and nitrogen containing edible organic compound are described.

The compositions are advantageous in that they make possible comestible products of enhanced whiteness or lightness of color. The compositions are further advantageous in that $TiO_2$ which is a relatively dense material does not settle but remains dispersed in the compositions.

---

The invention relates to comestible compositions and more particularly, to compositions of enhanced whiteness or lightness of color comprising a comestible base and a blend of finely divided food grade $TiO_2$ and an edible organic compound selected from the group consisting of edible nitrogen containing compounds, sulfur containing compounds, and edible sulfur and nitrogen containing compounds. The invention is advantageous in that it makes possible the whitening or the lightening of a wide variety of comestible compositions such as coffee whiteners, filled milk, whipped toppings, sour cream substitutes, cake icings, enrobing compositions for candy, prepared bakery mixes, and beverages such as coffee, tea, cocoa, and the like.

The present invention provides a composition comprising:
(a) a comestible base, and
(b) a blend of finely divided $TiO_2$ and an edible organic compound selected from the group consisting of edible nitrogen containing compounds, edible sulfur containing compounds, and edible nitrogen and sulfur containing compounds; said $TiO_2$ being present in an amount sufficient to increase the light reflectance of said base.

The compositions falling within the scope above described are advantageous in that they provide enhanced whiteness or lightening to comestible bases in which this property is desired. They are further advantageous in that the $TiO_2$ component remains suspended and dispersed in aqueous or nonaqueous liquid comestibles which are present in the final comestible or are present during the preparation of the comestible base.

The term "edible organic compound" as used herein is intended to mean and to refer to a class of edible organic compounds which contain either sulfur, nitrogen, or both sulfur and nitrogen. Among the nitrogen containing edible organic compounds are the amino acids including glycine, leucine, glutamic triptophan, lysine, phenyl alanine, threonine, valine, alpha alanine, serine, norleucine, proline, hydroxy proline, and aspartic acid as well as nicotinic acid.

Edible nitrogen containing compounds other than amino acids are pyridoxine, caffeine, lecithin, cephalin, choline bitartrate, and choline bichloride, among others.

Among the sulfur containing compounds are sulfoacetate derivatives of mono- and diglycerides wherein the carboxylic acid ester moieties of the mono- and diglycerides are edible fatty acids containing between 6 and about 30 carbon atoms in the fatty acid chain.

Among the compounds which contain sulfur and nitrogen are methionine, cystine, cyclohexosulfamic acid and salts thereof, orthobenzene sulfimide and the sodium salt thereof.

The term "comestible base" as used herein is intended to mean and to include conventional edible products whose properties can be enhanced by increasing the light reflectance and/or whitening of the products.

The term "finely divided food grade $TiO_2$" as used herein is intended to mean and to refer to $TiO_2$ particles in rutile or in anatase crystalline forms or in mixtures of these forms wherein the $TiO_2$ is substantially free from impurities and is certified by a controlling food and drug authority and is suitable for food use. Such finely divided $TiO_2$ is further characterized in that it is composed of particles having an average ultimate particle size between about 0.1 and 0.7 micron.

The term "pigmentary food grade $TiO_2$" as used herein is intended to mean and to refer to finely divided food grade $TiO_2$ wherein the particles have an average particle size between about 0.28 and about 0.32 micron and a particle size distribution such that the preponderance of the particles have an ultimate particle size between 0.2 and 0.4 micron.

The edible organic compound: $TiO_2$ blend can be suitably prepared in a number of ways, the specific method used being dependent upon whether the edible compound is liquid or solid. When the edible organic compound is a liquid, the blend can be prepared by mixing the compound with the $TiO_2$ in a mechanical mixer such as a Waring Blendor. Where the edible organic is a solid, the blend can be suitably prepared by liquifying the compound with heat or dissolving it in an inert liquid diluent, dispersing the $TiO_2$ in the diluent and thereafter removing the liquid diluent by evaporation or the like.

The amount of edible organic compound which can be employed in the edible organic compound: $TiO_2$ blend in conjunction with the comestible bases to form the comestible compositions of this invention will depend to an important extent upon the amount of $TiO_2$ which it is desired to use because, as will be hereinafter evident, the edible organic compound tends to act as a suspending agent for the $TiO_2$ particles.

The edible organic compound is advantageously employed in an edible organic compound:$TiO_2$ weight ratio of between about 1:100 and about 10:1. Although ratios greater than 10:1 can be employed, there is usually no advantage and when such ratios are employed, the compositions may sometimes be uneconomical. If ratios of less than 1:100 are employed, there is some danger that the $TiO_2$ will not remain in suspension in certain of the hereinafter defined comestible bases. In general, edible organic compound:$TiO_2$ ratios of between 1:10 and 10:1 have been found especially suitable in most of the comestible compositions. The finely divided food grade $TiO_2$ which can be employed in the blend can be either rutile, anatase, or mixtures of these crystalline $TiO_2$ forms. The particular crystalline type will usually depend upon the kind of comestible base in which the blend is employed. Generally, the rutile form of $TiO_2$ tends to impart a pale bluish-white tinge or tint to the comestible base containing it whereas anatase $TiO_2$ tends to impart a pale redish or yellowish-white tinge or tint to such base. From the standpoint of particle size, food grade pigmentary $TiO_2$ is preferred because $TiO_2$ particles having this particle side are more efficient in whitening or reflecting light than are the non-pigmentary (e.g., smaller) $TiO_2$ particles.

Since rutile $TiO_2$ has a density of about 4 grams per cm.$^3$ and anatase $TiO_2$ has a density of 3 grams per cm.$^3$, it was surprising to find that these materials which have a significantly greater density than most comestible bases, particularly liquid comestible bases, would form stable suspensions in such comestibles.

The compositions of this invention include a wide variety of liquid, solid, and semisolid conventional comestible bases such as, for example, imitation milk, beverage whiteners, whippable dairy toppings, filled milk products, sour cream bases, frozen desserts including ice cream and frozen custard, and the like; icings (e.g., coatings for baked goods); pastel confectioner's coatings; mayonnaise and salad dressings; syrups including any syrups used in comestibles, and dusting sugars such as doughnut sugars.

As will be evident from the specific examples, the edible organic compound:$TiO_2$ blend can be readily incorporated in any of the aforementioned food products to form the comestible compositions falling within the scope of this invention.

The amount of blend employed is a small amount, usually between 0.01 to about 5 weight percent, basis the weight of the comestible compositions. Amounts falling within this range will generally whiten or increase the light reflectance of the comestible. Although in some instances, less than about 0.01 weight percent of the blend can be employed, usually such an amount of blend will not result in products having the degree of enhanced whiteness desired. On the other hand, although more than about 5% of the blend can sometimes be employed, there is usually no advantage and comestible compositions containing such amounts are sometimes uneconomical.

Since most of the conventional comestible compositions involve mixtures of said soluble and water soluble components, it will be readily apparent to those skilled in the art that the blend component of this invention will tend to remain in the aqueous or water phase of the comestible at least during its preparation. It has been found that although it is possible by the use of other kinds of $TiO_2$ blends to disperse $TiO_2$ entirely in the oil phase, increased whitening is accomplished with the same amount of $TiO_2$ when the latter is in the water or nonoily phase. Sometimes when using the present blends, a portion of $TiO_2$ in the blend will undergo phase migration from the water to the oil phase and thus, the $TiO_2$ may be present in both the oil and the water phases in the comestible compositions of this invention.

The following specific examples are intended to illustrate the invention but not to limit the scope thereof, parts and percentages being by weight unless otherwise specified.

EXAMPLE 1

Blends of organic compounds and $TiO_2$ were prepared using the ingredients in the proportions listed in Table I.

TABLE I

| Blend Number | Grams | | | | | | | |
|---|---|---|---|---|---|---|---|---|
| | 1 | 2 | 3 | 4 | 5 | 6 | 7 | 8 |
| Ingredients: | | | | | | | | |
| Anatase $TiO_2$ | 10 | 5 | | 5 | 1 | 10 | | 5 |
| Rutile $TiO_2$ | | | 5 | 10 | | 1 | 10 | 5 |
| Lecithin | 10 | | | | 3 | | 19 | 5 |
| Tryptophane | | 5 | | | | | | |
| l-leucine | | | 20 | | | | | |
| Methionine | | | | | 3 | | | |
| Aspartic acid | | | | 10 | | | | |
| 3-(sulfoaceto) 1,2-diglyceride [1] | | | | | | 9 | | 5 |
| Niacin amide | | | | | | 1 | | |
| Sodium N-cyclohexyl sulfamate | | | | | | | 1 | |
| O-benzo sulfimide | | | | | | | | 1 |

[1] Palmitic and stearic diglyceride.

The above blends were prepared by mixing the various kinds of $TiO_2$ with the various organic compounds using a mortar and pestle.

These were set aside for incorporation in various comestible bases as shown in the following examples.

EXAMPLE 2

Imitation milk products containing the ingredients in the amounts listed in Table II were prepared.

TABLE II

| | Lightened, percent | Nonlightened (control) percent |
|---|---|---|
| Ingredients: | | |
| Demineralized whey solids | 5.50 | 6.50 |
| Sodium caseinate | 1.00 | 1.00 |
| Stabilizer [1] | 0.75 | 0.75 |
| Salt | 0.10 | 0.10 |
| Water | 87.85 | 87.85 |
| Lauric hard butter | 3.50 | 3.50 |
| Glyceryl lactopalmitate | 0.30 | 0.30 |
| Blend No. 1 of Example 1 | 1.00 | |
| Reflectance, percent | 68 | 57 |

[1] 92 parts microcrystalline cellulose, 8 parts sodium carboxymethyl cellulose.

The above product was prepared by adding the $TiO_2$ blend and the stabilizer to the water which is maintained at a temperature of 70° F. These ingredients were mixed and are dispersed and the resultant liquid was then heated to 110° F. To this mixture, there is added a blend comprising the whey solids, sodium caseinate, and salt. Thereafter, a dry blend of the lauric hard butter and superglycerinated fat is added to the liquid which is heated to 160° F. for 30 minutes. The resultant dispersion is homogenized at 2000 and 5000 p.s.i., through a two-stage homogenizer. Thereafter, the resulting product is cooled to 40° F. as rapidly as possible. If the $TiO_2$ is added to the product without having been previously blended with the edible organic compound, the $TiO_2$ will not remain dispersed in the liquid imitation milk but will settle to the bottom of the liquid and the imitation milk will then have almost the same reflectance as that of the control. Light reflectance measurements were made using a direct reading reflectance colorimiter. It will be noted that the $TiO_2$-containing milk has a significantly greater reflectance percent demonstrating the whitened product resembling that of natural milk.

EXAMPLE 3

Imitation sour cream cheese containing the ingredients in the amounts listed in Table III were prepared.

TABLE III

| | Lightened, percent | Nonlightened (control) percent |
|---|---|---|
| Ingredients: | | |
| Nonfat milk solids | 8.5 | 9.0 |
| Water | 74.2 | 74.2 |
| Domestic hard butter | 15.5 | 16.0 |
| Superglycerinated fat | 0.6 | 0.6 |
| Stabilizer [1] | 0.2 | 0.2 |
| Blend No. 2 of Example 1 | 1.0 | |
| Reflectance, percent | 98 | 88.5 |

[1] Natural gums.

The preparation was accomplished by dispersing the milk solids, stabilizer and $TiO_2$ blend to the water. Thereafter, the hard butter and superglycerinated fat are added and the resultant mixture is heated at 180° C. for 20–30 minutes to afford an intimate dispersion. Thereafter, the mixture is passed through a two-stage homogenizer operating at 2000 and 500 lbs., respectively. The mix is then cooled to 65° F. and 2% of a cheese bacterial culture was added to the total mix which is incubated at 70–72° F. until the pH of the mixture drops to 4.6. If desirable, seasoning can be added. The mixture is cooled to 40° F. for packaging. Surprisingly, if $TiO_2$ is added, per se, rather than in the form of the blend to the water along with the milk solids, the $TiO_2$, will not remain dispersed but will settle to the bottom of the mixture. The $TiO_2$ containing sour dressing has a significantly greater reflectance percent demonstrating a whitened product resembling that of natural sour cream.

EXAMPLE 4

Nondairy fat cream cheese bases to which cheese culture organisms are added to produce nondairy fat cream cheese where prepared using the ingredients in the amounts listed in Table IV.

TABLE IV

| Ingredients: | Lightened, percent | Nonlightened (control) percent |
|---|---|---|
| Nonfat milk solids | 10.00 | 10.00 |
| Salt | 0.50 | 0.50 |
| Stabilizer [1] | 0.45 | 0.45 |
| Water | 63.55 | 63.55 |
| Superglycerinated fat | 0.50 | 0.50 |
| Domestic hard butter | 24.00 | 25.00 |
| Blend No. 3 of Example 1 | 1.00 | |
| Reflectance, percent | 93 | 88 |

[1] Natural carbohydrate gums.

The nondairy fat cream cheese was prepared by mixing the milk solids, salt, and stabilizer and the $TiO_2$ blend in the test sample. By adding them to cold water, mixing was accomplished by mechanical means to disperse the solids and the dispersion was heated to 110° F. after which time the domestic hard butter and superglycerinated fat are added. The resultant mixture is heated to 180° F. for 15 minutes and is thereafter homogenized by passing it through a two-stage homogenizer operating at 2500 and 500 p.s.i., respectively. The mixture is cooled to 72° F. as rapidly as possible and 2–5% cream cheese culture is added and mixed with the liquid which is then incubated at 72° F. until the mixture has a pH of 4.6. Thereafter, the mixture is cooled to 40° F. and packaged.

EXAMPLE 5

Whippable topping mixtures having the ingredients in the percentage listed in Table V were prepared.

TABLE V

| Ingredients: | Lightened, percent | Nonlightened (control) percent |
|---|---|---|
| Sugar | 10.00 | 10.00 |
| Sodium caseinate | 2.00 | 2.00 |
| Stabilizer [1] | 0.10 | 0.10 |
| Water | 59.80 | 60.80 |
| Lauric hard butter | 16.00 | 16.00 |
| Coconut oil | 5.00 | 5.00 |
| Partially hydrogenated vegetable oils | 5.00 | 5.00 |
| Superglycerinated fat | 0.95 | 0.95 |
| Glyceryl lactopalmitate | 0.15 | 0.15 |
| Blend No. 4 of Example 1 | 1.00 | |
| Reflectance, percent | 79 | 70 |

[1] Natural gums.

Preparation is accomplished by adding the sugar, sodium caseinate, stabilizer, and $TiO_2$ blend were added to the cold water and with vigorous mechanical agitation to disperse the solids. To this liquid, there was added lauric hard butter, coconut oil, partially hydrogenated vegetable oil, the superglycerinated fat and glycerol lactopalmitate. While mixing is continued, the total mixture is pasteurized by heating it to 160° F., or for 30 minutes, and thereafter is passed through a two-stage homogenizer operating at 1500 and 500 p.s.i., respectively. After homogenization, the mixture is cooled as rapidly as possible to 40° F. and aged for at least 24 hours before whipping. It should be noted as indicated by the reflectance that the $TiO_2$-containing topping is significantly whiter than that of the control mixture. If $TiO_2$ is added to the above mixture without having been blended with an edible organic compound, the $TiO_2$ will settle to the bottom of the liquid.

EXAMPLE 6

Imitation or filled milk products having the ingredients in the amounts listed in Table VI were prepared.

TABLE VI

| Ingredients: | Lightened, percent | Nonlightened (control) percent |
|---|---|---|
| Water | 86.25 | 87.25 |
| Nonfat milk solids | 9.00 | 9.00 |
| Lauric hard butter | 3.50 | 3.50 |
| Superglycerinated fat | 0.25 | 0.25 |
| Blend No. 5 of Example 1 | 1.00 | |
| Reflectance, percent | 66 | 50 |

The preparation is accomplished by adding the nonfat milk solids to the water along with the $TiO_2$ blend. When used, the mixture is heated to 120° F. and the lauric hard butter and superglycerinated fat are added. Thereafter, the mixture is heated to 160° F. for 30 minutes and passed through a two-stage homogenizer operating at 2000 and 500 p.s.i., respectively. The product is then cooled as rapidly as possible to 40° F. As indicated by the reflectance measurements set forth above, the $TiO_2$-containing product is significantly whiter than the corresponding control. If $TiO_2$ is added without having been blended with the edible organic compound, it will not remain suspended in the liquid but will separate and the liquid will have the appearance of the control.

EXAMPLE 7

Cake icings were prepared using the ingredients in the amounts listed in Table VII.

TABLE VII

| Ingredients: | Lightened, percent | Nonlightened (control) percent |
|---|---|---|
| Powdered sugar | 64.25 | 66.25 |
| Hydrogenated vegetable oil | 14.30 | 14.30 |
| Superglycerinated fat | 0.70 | 0.70 |
| Milk powder | 5.00 | 5.00 |
| Corn syrup solids | 2.50 | 2.50 |
| Egg whites | 3.00 | 3.00 |
| Salt | 0.25 | 0.25 |
| Blend No. 6 of Example 1 | 2.00 | |
| Water | 8.00 | 8.00 |
| Reflectance, percent | 93 | 80 |

The powdered sugar, hydrogenated vegetable oil, superglycerinated fat, milk powder, corn syrup solids, egg whites, and salts were dry blended in a 40-quart Hobart mixer. The $TiO_2$ blend was added to the water which had been heated to 120° F. and which was slowly added to the dry mix until a smooth blend was obtained. Thereafter, the material was mixed for an additional five minutes during which time a little vanilla was added for flavoring purposes. The light reflectance demonstrates the greater whitening or white color of the $TiO_2$-containing icing.

EXAMPLE 8

Frozen desserts were prepared using the ingredients listed in Table VIII.

TABLE VIII

| Ingredients: | Lightened, percent | Nonlightened (control) percent |
|---|---|---|
| Nonfat milk solids | 12.0 | 12.0 |
| Sugar | 12.0 | 12.0 |
| Corn syrup solids | 5.0 | 5.0 |
| Water | 59.0 | 60.5 |
| Butter fat | 10.0 | 10.0 |
| Stabilizer—emulsifier [1] | 0.5 | 0.5 |
| Blend No. 7 of Example 1 | 1.5 | |
| Reflectance, percent | 85 | 75 |

[1] Superglycerinated fat, 2 parts, sodium carboxymethyl cellulose, 3 parts.

Mixing is accomplished by adding the milk solids, sugar, corn syrup, and $TiO_2$ blend to the water. Thereafter, the butter fat is added to the water along with the stabilizer. The mixture is agitated and pasteurized at 160° F. for 30 minutes. The mixture is then passed through a two-stage homogenizer operating at 2500 and 500 p.s.i., respectively. The mixture is cooled to 40° F., aged at this temperature for 12 hours, flavor is added, and the mixture is frozen to produce a frozen dessert. If the $TiO_2$ is added to the mixture without being blended with the edible organic compound, it will settle to the bottom of the mixture during pasteurization. The reflectance measurements illustrate the enhanced whitening color of the $TiO_2$ frozen dessert over that of the control.

EXAMPLE 9

Liquid coffee whitener was prepared using the ingredients in the amounts listed in Table IX.

TABLE IX

| Ingredients: | Lightened, percent | Nonlightened (control) percent |
|---|---|---|
| Lauric hard butter | 17.80 | 17.80 |
| Corn syrup solids | 22.80 | 24.80 |
| Sodium caseinate | 2.48 | 2.48 |
| Dipotassium phosphate | 0.99 | 0.99 |
| Sugar | 1.49 | 1.49 |
| Superglycerinated fat | 2.54 | 2.54 |
| Water | 49.70 | 49.70 |
| Blend No. 8 of Example 1 | 1.0 | |
| Blend No. 2 of Example 1 | 1.0 | |
| Reflectance, percent | 57 | 47 |

TABLE X

[Spray dried product of Example 9]

| Ingredients: | Lightened, percent | Nonlightened, percent |
|---|---|---|
| Lauric hard butter | 35.60 | 35.60 |
| Corn syrup solids | 45.50 | 49.50 |
| Sodium caseinate | 4.95 | 4.95 |
| Dipotassium phosphate | 1.98 | 1.98 |
| Sugar | 2.98 | 2.98 |
| Superglycerinated fat | 5.04 | 5.04 |
| Blend No. 8 of Example 1 | 2.0 | |
| Blend No. 2 of Example 1 | 2.0 | |

The coffee whiteners are prepared by placing the ingredients in a Wiley Blender and mixing them until a pasteurization temperature of 165° F. is reached. The resulting liquid is passed through a two-stage homogenizer operating at 2500 and 500 p.s.i., respectively. The liquid product consisted of an oil-in-water emulsion containing $TiO_2$ dispersed in the aqueous phase. Reflectance measurements were taken and are shown at the bottom of Table IX.

After homogenization, the liquid emulsion is gravity-fed into a Bowen Conical Type, Model BE607, spray drier. The air inlet chamber, the drying chamber temperature, and the air outlet temperature were maintained at 350° F., 230° F., and 205° F. respectively during the drying process. After drying, the resultant product containing less than 1 weight percent moisture consisted of a white granular powder having the compositions listed in Table X.

If the $TiO_2$ is added to the liquid mixture without first being blended with the edible organic compound, the $TiO_2$ will settle to the bottom of the liquid before spray drying can be accomplished.

To two separate 6-oz. portions of freshly brewed coffee maintained at a temperature of 180° F., there was added 0.2 oz. of the $TiO_2$-containing coffee whitener and the control coffee whitener which contained no $TiO_2$. Light reflectance readings were taken and the following results were obtained.

| Formulation: | Light reflectance of coffee, percent |
|---|---|
| Control formulation | 41 |
| Formulation containing $TiO_2$ | 50 |

The subject of this patent application is similar to the subject matter within U.S. patent applications Ser. Nos. 723,900, 723,902, 723,901, and 723,921, filed respectively in the names of John V. Luck, Camilo Quesada, Frederick R. Paulicka, and Alexander E. Thomas and filed simultaneously with the present application and also assigned to the same assignee.

What is claimed is:
1. A composition comprising
   (a) a comestible base and
   (b) a blend of finely divided $TiO_2$ and edible organic compound selected from the group consisting of amino acids and sulphoacetate derivatives of mono-amino acids and sulphoacetate derivatives of mono- and diglycerides, wherein the carboxylic acid ester moieties of the mono- and diglycerides are edible fatty acids containing between 6 and 30 carbon atoms in the fatty acid chain; said $TiO_2$ being present in an amount sufficient to increase the light reflectance of said base and wherein the blend of edible organic compound and $TiO_2$ has an organic compound: $TiO_2$ weight ratio of between about 1:100 and about 10:1.
2. The composition of claim 1 wherein the organic compound is an amino acid.
3. The composition of claim 1 wherein the organic compound is a sulphoacetate derivative of a mono- or diglyceride wherein the carboxylic acid ester moieties of the mono- and diglyceride are edible fatty acids containing between 6 and 30 atoms in the fatty acid chain.
4. The composition of claim 1 wherein the finely divided food grade $TiO_2$ is pigmentary.
5. The composition of claim 1 wherein the comestible base is a coffee whitener.
6. The composition of claim 1 wherein the comestible base is a confectionery icing.
7. The composition of claim 1 wherein the comestible base is a whipped topping.
8. The composition of claim 1 wherein the comestible base is an artificial milk.

References Cited

UNITED STATES PATENTS

| 2,925,365 | 2/1960 | Nicholson | 99—148X |
| 3,015,573 | 1/1962 | Myers et al. | 106—300 |
| 3,266,907 | 8/1966 | Kozlik et al. | 99—139 |
| 3,451,835 | 6/1969 | Ganter et al. | 106—308.0 |

OTHER REFERENCES

Mitsui: "Improvement on Dispersion of Inorganic Pigment by Surface Treatment," American Perfumes and Cosmetics, vol. 80, August 1965, pp. 23 to 28.

JOSEPH M. GOLIAN, Primary Examiner

U.S. Cl. X.R.

99—63, 118; 106—300, 308; 424—49, 63, 64, 69, 127